United States Patent [19]

Ahmose

[11] Patent Number: 5,382,166
[45] Date of Patent: Jan. 17, 1995

[54] ELECTRON-SPACE DIAGRAM AND DISPLAY MODEL

[76] Inventor: Rhamal M. Ahmose, P.O. Box 296, Fort George G. Meade, Md. 20755

[21] Appl. No.: 104,860

[22] Filed: Aug. 12, 1993

[51] Int. Cl.6 .......................................... G09B 23/26
[52] U.S. Cl. .................................. 434/281; 434/404
[58] Field of Search ............... 434/276, 278, 280, 281, 434/286, 404

[56] References Cited

U.S. PATENT DOCUMENTS

| | | | |
|---|---|---|---|
| 3,325,914 | 6/1967 | Bliss et al. | 434/278 |
| 3,365,815 | 1/1968 | McCue | 434/278 |
| 4,192,084 | 3/1980 | O'Riordán | 434/278 |
| 4,496,324 | 1/1985 | Schulz | 434/295 |

Primary Examiner—Gene Mancene
Assistant Examiner—Jeffrey A. Smith

[57] ABSTRACT

The Electron-Space Display Model (ESDM) is a teaching aid for demonstrating the systematic patterns in which electrons are distributed within space confinements, called shells and subshells, radiating outward in the space surrounding an atomic nucleus. Among the components of the ESDM is a diagram depicting, by means of color-coded configurations, the shells and subshells contrived by scientists to conceptualize the atomic domains of electrons and how they lawfully inhabit those domains. The diagram also features specific points (tiny apertures) designated "electron-spaces" within the subshells illustrating places where electrons would conceptually be found if "frozen" in position. Behind the diagram is a rotatable wheel with over 5000 tiny apertures precisely and systematically placed such that they align in 103 different patterns with the apertures in the diagram. When light flashes from light sets within the housing of the ESDM, from behind the wheel and diagram, it penetrates the aligned apertures, and these flashes appear in the electron-spaces of the diagram against the atomic background. Turning the wheel in three-degree increments shows the electron distribution pattern within shells and subshells for each of the 103 elements featured in a conventional *Periodic Table of the Elements*. These distribution patterns have been, for many years, presented in chart form with several rows and columns of numbers and atomic symbols.

7 Claims, 7 Drawing Sheets

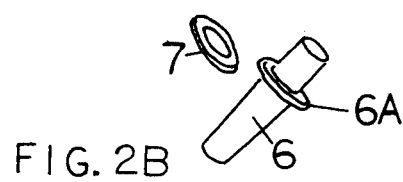
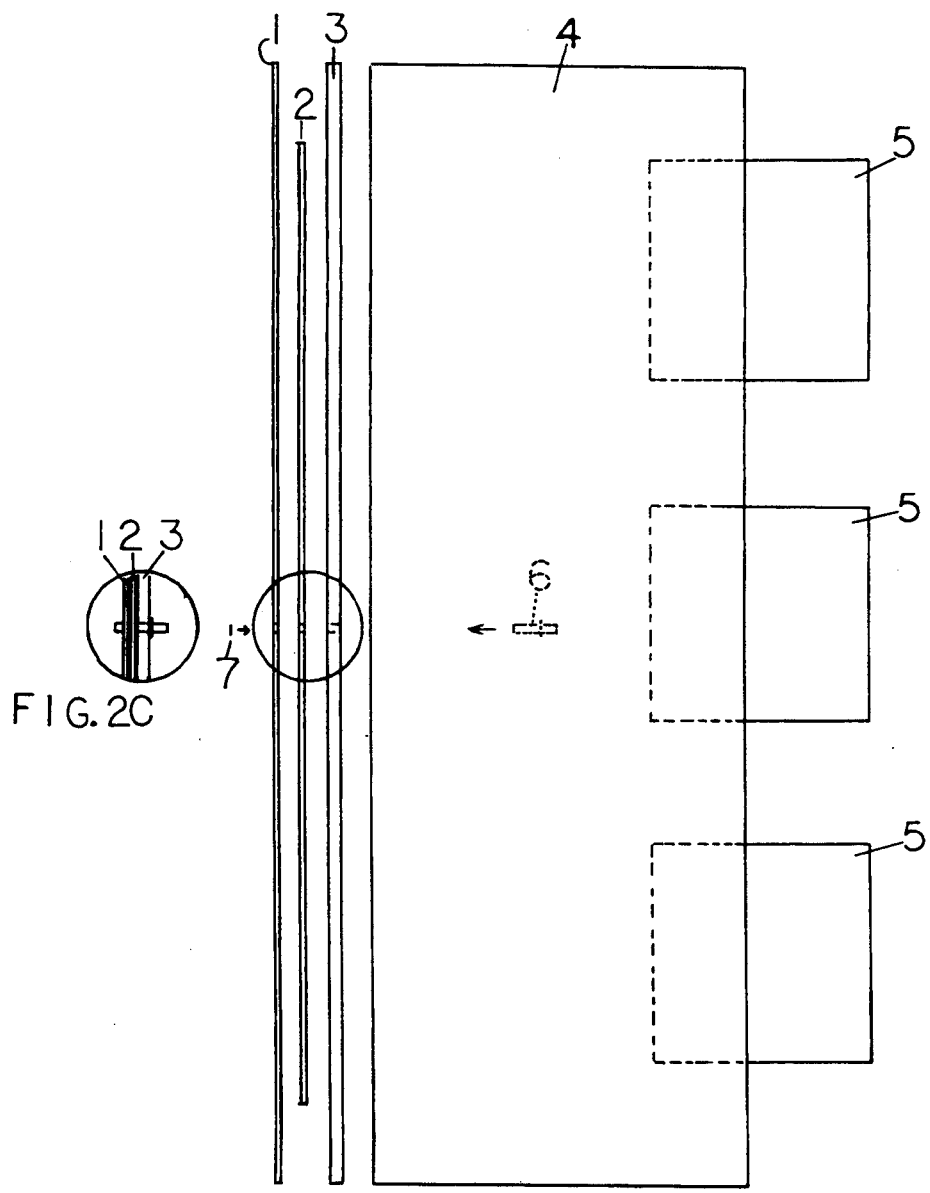

ELECTRON-SPACE DIAGRAM AND DISPLAY MODEL

BACKGROUND OF THE INVENTION

1. Technical Field

The invention is a simple mechanical device employing the alignment tiny apertures made in a thin rectangular board (bearing the diagram) with apertures made in a paperboard-thin wheel attached behind the board (the wheel and board attached at their centers) when the wheel is turned at specific three-degree intervals, such as to display 103 different patterns of light flashing through the aligned apertures.

2. Background Art

In the area of education, methods of explaining and/or depicting the space around the nucleus of an atom have been limited to presenting the electron distribution occuring in the outer two or three subshells. While this presentation has been adequate for elements whose total number of electrons is no more than 10 and thus inhabit (in an unexcited state) only the innermost two shells (a three subshell maximum), for heavier atoms this method leaves out much information. For example, for the heavier elements (i.e., those with greater atomic numbers and thus larger numbers of electrons), information about the electron distribution in as many as 15 subshells (which can contain up to 94 electrons) is omitted or not easily conceptualized, when only the three outermost subshells are described.

Even when a comprehensive chart of the electron distributions is presented to the student of atomic physics (whether in highschool or at the university level), a chart with several rows and columns of numbers aids much less in the conceptualization of the space around an atom's nucleus than a comprehensive diagram which actually shows a sort of "stop action picture" of electrons lawfully inhabiting their proper places about the atom's nucleus.

SUMMARY

The Electron-Space Diagram (ESD) and Electron-Space Display Model (ESDM) are interrelated devices which, together, show a graphic display of the configuration of electrons about the nucleus of an atom of any of the known elements. The ESD is a graphic drawing on a board of suitable thickness such as to allow small beams of flashing light to penetrate tiny apertures made in the ESD, from behind the board. The ESD uses a color-coded design to represent what are called "shells" and "subshells" of an atom; these are space confinements for electrons and are lawfully inhabited by electrons flying in otherwise unpredictable paths about the nucleus of the atom to which those electrons belong.

The ESDM is a simple mechanical device consisting essentially of the board bearing the ESD; a rotatable wheel affixed behind the ESD; an axle upon which the wheel turns at its center and which also pierces the center of the ESD, providing a common center for the ESD and wheel; a support structure for the axle; and a support frame for the entire device, containing strobe lights which flash light, from the back of the ESDM, through apertures in the wheel and ESD.

The ESDM incorporates a selection procedure wherein any one of the 103 elements of a conventional Periodic Table of the Elements can be selected by turning the wheel to the appropriate position and "locking" it in place. The ESDM is designed such that specific three-degree turns of the wheel show 103 variations in the alignment of apertures in the ESD and in the wheel. Each of these variations shows tiny light beams flashing in the diagram, representing electrons "frozen" in place and lawfully inhabiting their shells and subshells as presented in an electron distribution chart. The obvious advantage of the ESDM over an electron distribution chart is that a diagram is worth a thousand numbers and elemental symbols presented in various and columns. The obvious advantage over textbook and teacher-drawn models of the space around an atomic nucleus is that they typically present only the outer two or three subshells of an atom, omitting much information about electron distributions in the inner regions of the atomic space.

DESCRIPTION OF THE DRAWINGS

FIG. 2A shows a side view of the ESDM.

FIG. 2B shows an enlarged view of the axle-piece and securing ring.

FIG. 2C shows a section of the components of FIG. 2A joined by the axle piece and securing ring.

DETAILED DESCRIPTION OF THE DRAWINGS

Figure 1:
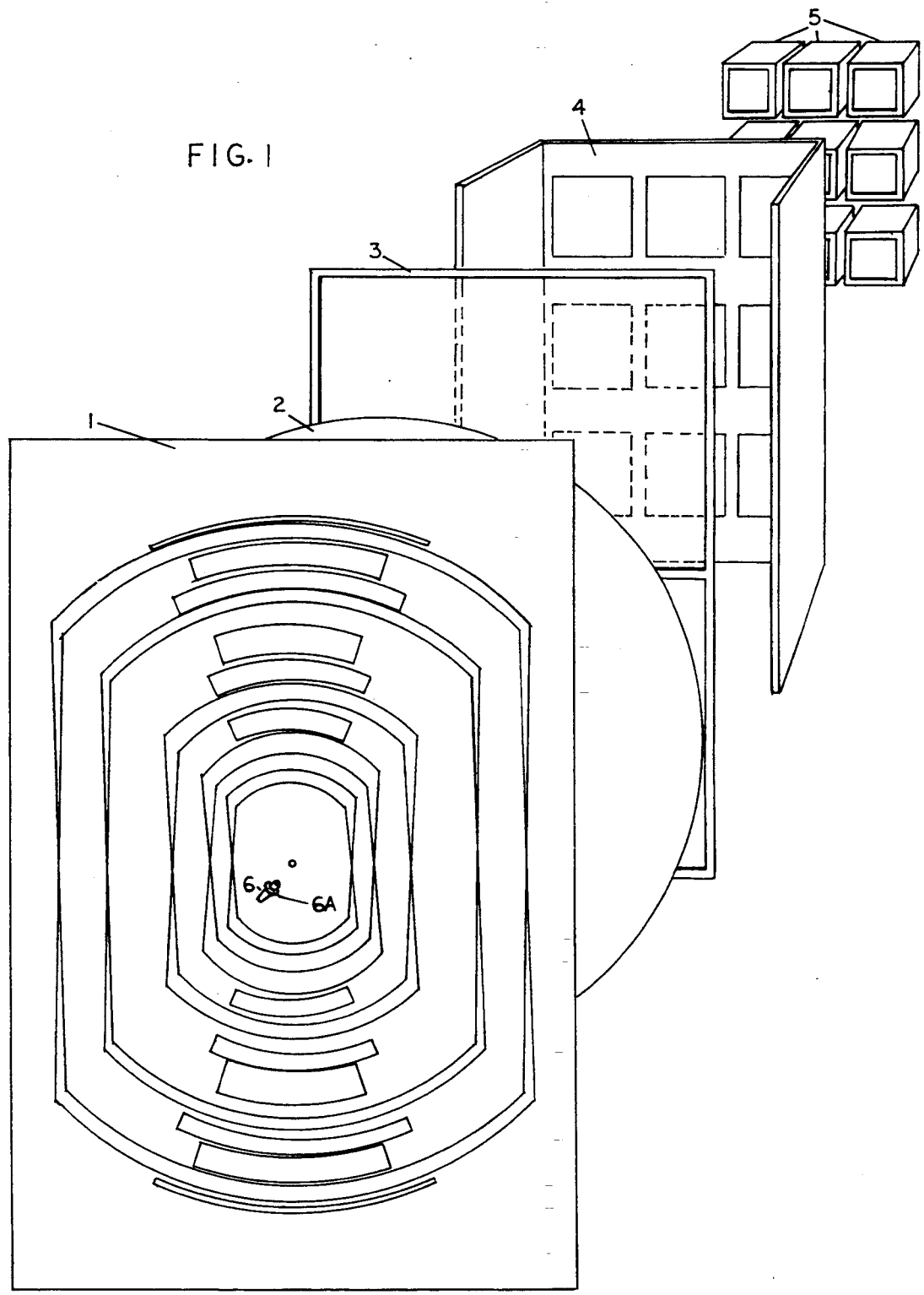
FIG. 1 shows an "exploded view" of the ESDM.

In FIG. 1, the nine strobe light sets 5 are inserted (moving forward) into the nine cutout slots of the ESDM housing 4, the latter made of wood, plastic, aluminum or other suitably firm material. The thickness of each of the three sides constituting this frame or housing should be about ¼ inch. 3 is another framelike structure (very similar to a window screen), having the same height and width dimensions as 4 and likewise made of plastic or aluminum. Its essential feature is the central strip running horizontal at its center. This strip has a hole bored through its center (blocked from view by 2 and 1 in the drawing) into which is inserted axle-piece 6, from behind 3, until axle-ring 6A is flush with the back of the strip. 3 is attached flush to the two sides of the housing 4, forming a "face" of the housing and maintaining the 24 in. width × 36 in. height dimensions. The 31-inch diameter wheel 2 is made of about 0.5 mm thick opaque plastic or other material that is resistant to warping. It has a hole bored through its center and is moved (via this aperture) along the frontal length of axle-piece 6. The ESD is a color-coded diagram drawn on a thin, opaque plastic board !, having the same width and length dimensions as 4 and 3. In all subsequent cases the ESD and board upon which it is drawn will be considered a unit referenced as 1.

In FIG. 2A, the three right-most strobe light sets 2 of FIG. 1 are shown inserted nearly halfway into the cutout slots in the back of housing 4. Axle-piece 6 is drawn in dotted lines indicating that it is behind the right sideboard of 4 and is moved in the direction of the arrow to be inserted (slightly over half its length) through the bored hole in axle-support-frame 3. The bored holes in axle-support-frame 1, wheel 2, and ESD 1 are highlighted by the circle drawn around them in the Figure. Securing ring 7 although circular appears in the Figure as a small line because it is shown from a side view. 7 is moved in the direction of the arrow near it and meets axle-piece 6 when the two are moved in the directions indicated.

FIG. 2B is an enlarged drawing of the axle-piece 6—showing more clearly the axle ring 6A—and of the securing ring 7, which is moved along the longer length of 6 to secure into place components of the ESDM affixed upon the axle-piece.

FIG. 2C shows the encircled section of 2A wherein axle-piece 6 is inserted into the bored holes of 3,2, and 1 and wherein 3,2, and 1 are pressed together and held in place by securing ring 7.

Prior to giving a detailed explanation of FIGS. 3 through 7, which present the design of the ESD specifically, a disclosure of what is known about the space around an atomic nucleus is helpful. (The nucleus is understood to be at the direct center of the diagram and is not important to represent in the diagram.) The broadest regions of space confinement for electrons in the space around an atom are called shells of which seven are most widely recognized and are labled K, L, M, N, 0, P, and Q. Shells are comprised of subshells labled "s", "p", "d", and "f". The subshells that make up shells accumulate in sequence. This means that while a shell may be composed of a single "s" subshell, it may otherwise be composed a single "s" and a single "p" subshell; or it may be composed of a single "s" and a single "p" and a single "d" subshell; or it may be composed of a single "s" and a single "p" and a single "d" and a single "f" subshell. But a shell may not be composed of a "p" without an "s"; or a "d" without an "s" and "p"; or an "f" without an "s", a "p", and a "d" subshell.

Figure 3:
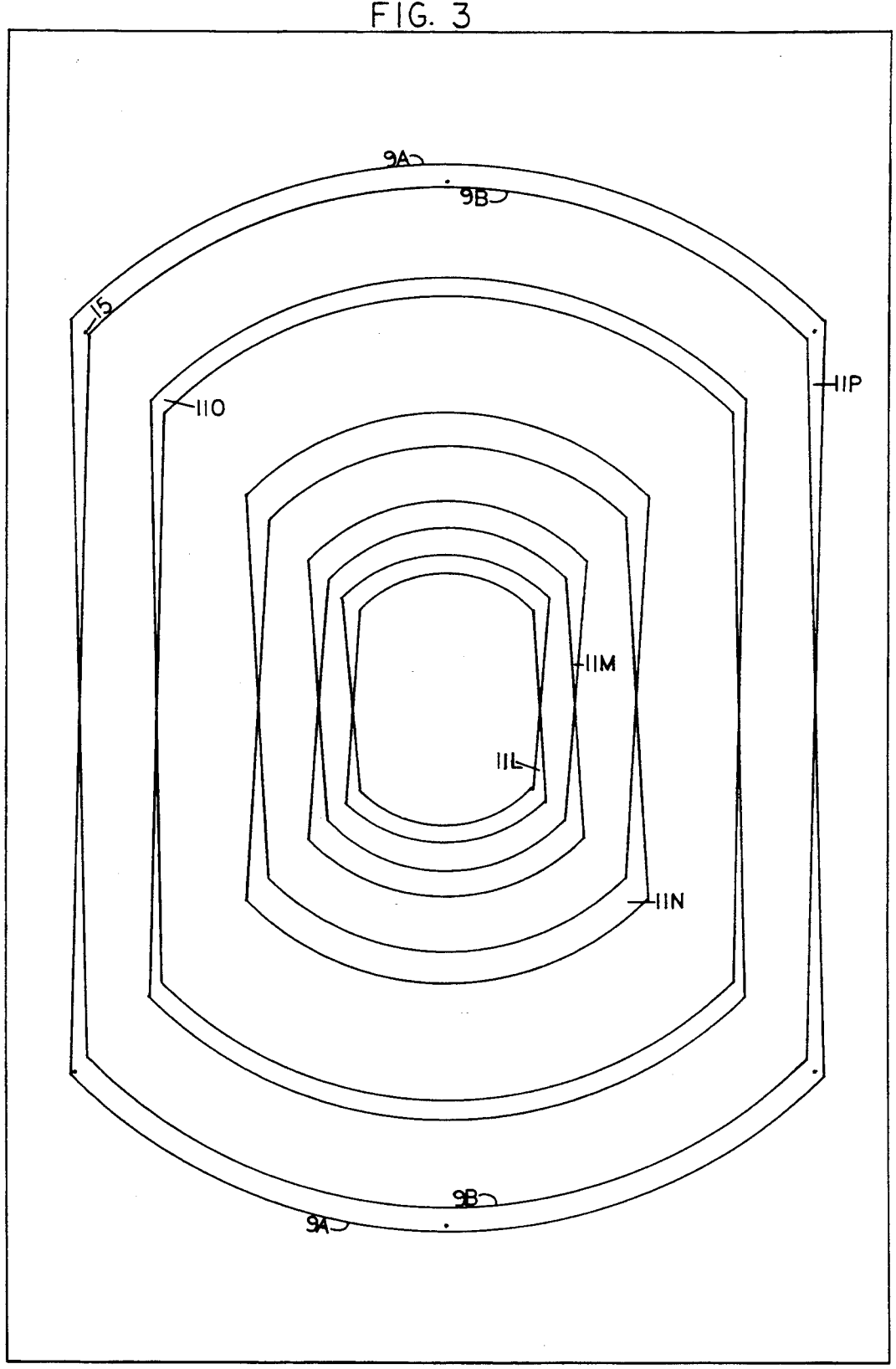
FIG. 3 shows "p" subshells of the ESD and shows electron-spaces within a subshell.

An incomplete drawing of the ESD 1 is shown in FIG. 3 to facilitate explaining the meaning of the shapes seen in the diagram. Each of the five identical configurations 11 radiating out from the center region of the ESD represents a region of space confinement for electrons traveling about the nucleus of an atom. The innermost configuration in FIG. 3 represents the "p" subshell of shell L—hence it is referenced as 11L. The next innermost configuration represents the "p" subshell of shell M—it is thus referenced 11M. This identification scheme is continued to the outermost configuration in the Figure, referenced as 11P. Color-coded red, "p" subshells in the ESD are presented for explanation here first because among the four types of subshells, they are most useful in identifying shells L through P. Also, as will be seen, each "p" subshell facilitates the identification of other subshells cohabiting its own shell.

Throughout subsequent explanations in this document, reference will be made to "the inner and outer arches of each symmetrical half" of a subshell. In FIG. 3, using the 11P subshell as an example, what is meant by "the upper symmetrical half" of that subshell is the half which is above the (imaginary) horizontal line dividing the ESD into halves; what is meant by "outer and inner arches" refers to the two arcs 9A and 9B that join The left and right laterals of that subshell. When the term "inner (or outer) arch of each symmetrical half" refers to a "d" or "f" subshell, the same identification procedure will allow an understanding of what is meant. Each "p" subshell can lawfully contain a maximum of 6 electrons. Each dot 15 in the outermost "p" subshell 11P represents an "electron-space." This is the space in the subshell where an electron might be found. Each "p" subshell has four "shoulders" (i.e., 2 sets of upper and lower symmetrical corners) where an electron-space in the diagram is located; and each also has an electron-space on the (imaginary) 90- and 270-degree angle-lines within the subshell- adding to six electron spaces for each "p" subshell. (Electron-spaces are not shown for the four innermost "p" subshells but axle identically situated.)

Figure 4:
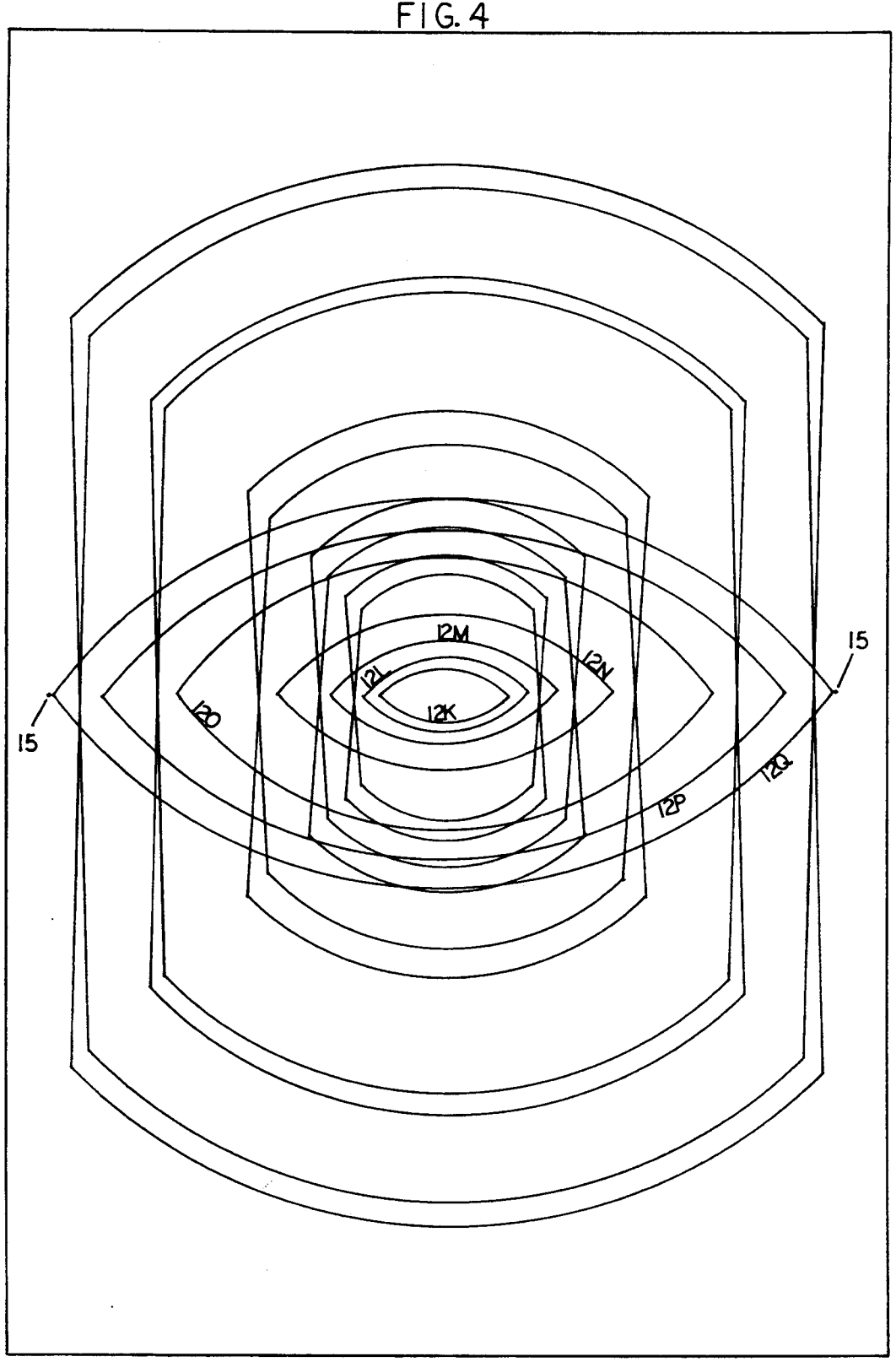
FIG. 4 shows "p" and "s" subshells of the ESD and shows electron spaces within a subshell.

FIG. 4 depicts the "p" subshells 11 of FIG. 3 along with a series of elipses 12 radiating out from the diagram's center. Each elipse represents an "s" subshell. The innermost elipse represents the "s" subshell of shell K; the next innermost, the "s" subshell of shell L; the next of shell M, and onward to the outermost elipse, indicating the "s" subshell of shell Q. Because shell K is composed of a single "s" subshell, the innermost elipse represents the entire K shell. Similarly, because shell Q is composed of a single "s" subshell, the outermost elipse represents the entire Q shell. In identifying which single "s" subshell and single "p" subshell inhabit the same shell is accomplished by first examining the "p" subshell in question then locating the elipse which has side ends "terminating" just inside the two laterals of that "p" subshell. Thus, the second innermost elipse 12L, located inside the two laterals of the innermost "p" subshell 11L, inhabits the L shell along with that "p" subshell. Said another way, the L shell is composed of the innermost "p" subshell 11L and the second innermost "s" subshell 12L. Similarly, the M shell is (at least partly) composed of the second innermost "p" subshell 11M and the third innermost "s" elipse 12M. In the ESD, "s" subshells are color-coded orange. The maximum number of electrons that may lawfully inhabit an "s" subshell is two. Thus a dot 15 is placed at each terminal end of an "s" subshell elipse to represent an electron-space. In FIG. 4, only shell Q shows electron spaces.

Figure 5:
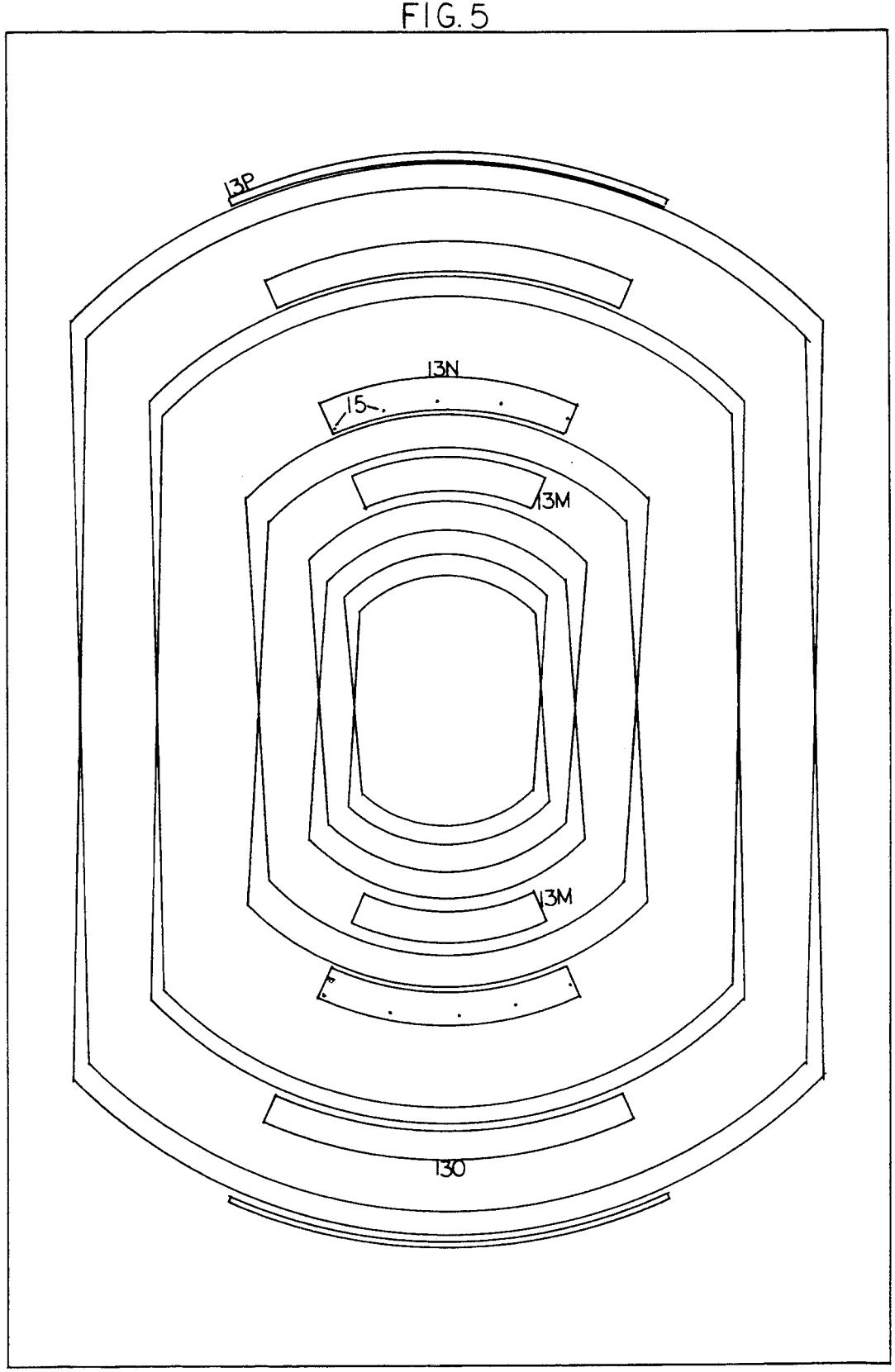
FIG. 5 shows "p" and "d" subshells of the ESD and electron spaces within a subshell.

FIG. 5 shows "p" subshells 11 in the ESD along with upper and lower symmetrical configurations 13 located just outside of upper and lower symmetrical arches of all except the innermost "p" subshell. Both upper and lower symmetrical halves of the configurations located just outside of a "p" subshell represent a single "d" subshell. Thus for example the second innermost "p" subshell has a configuration located just outside of its upper and lower symmetrical arches, and together those two configurations represent the "d" subshell 13M of shell M. The next outermost symmetrical pair, just outside of the "p" subshell of shell N, represents the "d" subshell 13N of shell N; and so on. Once again, the "p" subshell is instrumental in identifying the particular "d" subshell also inhabiting its shell. Only shells M,N,O, and P have "d" subshells and each is located just outside of the "p" subshell coinhabiting its shell. In the ESD, "d" subshells are color-coded blue. The maximum number of electrons that may lawfully inhabit a "d" subshell is ten. Each dot 15 in the "d" subshell of shell N 13N represents an electron-space; thus there are five dots in each half of 13N. Although not shown in the Figure, electron spaces are identically situated in each "d" subshell.

Figure 6:
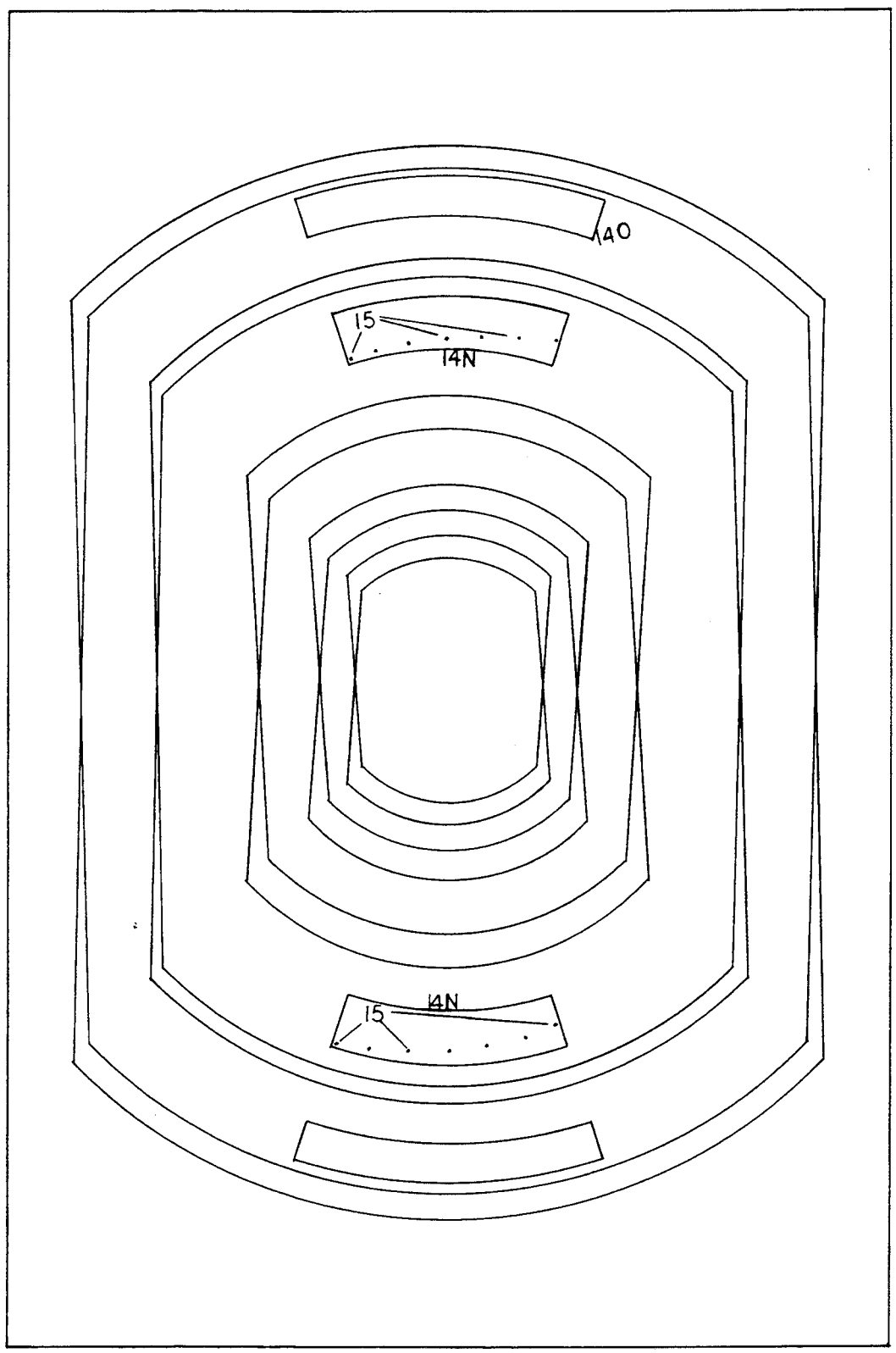
FIG. 6 shows "p" and "f" subshells of the ESD and electron spaces within a subshell.

FIG. 6 shows "p" subshells 11 in the ESD along with upper and lower symmetrical configurations 14 located at some distance outside the upper and lower symmetrical arches of the second and third outermost "p" subshells. Both upper and lower symmetrical halves of the configurations located (a small distance) outside of a "p" subshell represent a single "f" subshell; thus once again the "p" subshell is instrumental in identifying another subshell inhabiting its shell. Only shells N and O have "f" subshells. (The "small distance" between the "p" and "f" subshells within a shell is, in the complete diagram, filled in by the subshell also occupying that shell.) In the ESD, "f" subshells are color-coded green. The maximum number of electrons that may lawfully inhabit an "f" subshell is fourteen. Each dot 15 in the "f" subshell of shell N 14N represents an electron-space; thus there are seven dots in each symmetrical half of 14N.

Figure 7:
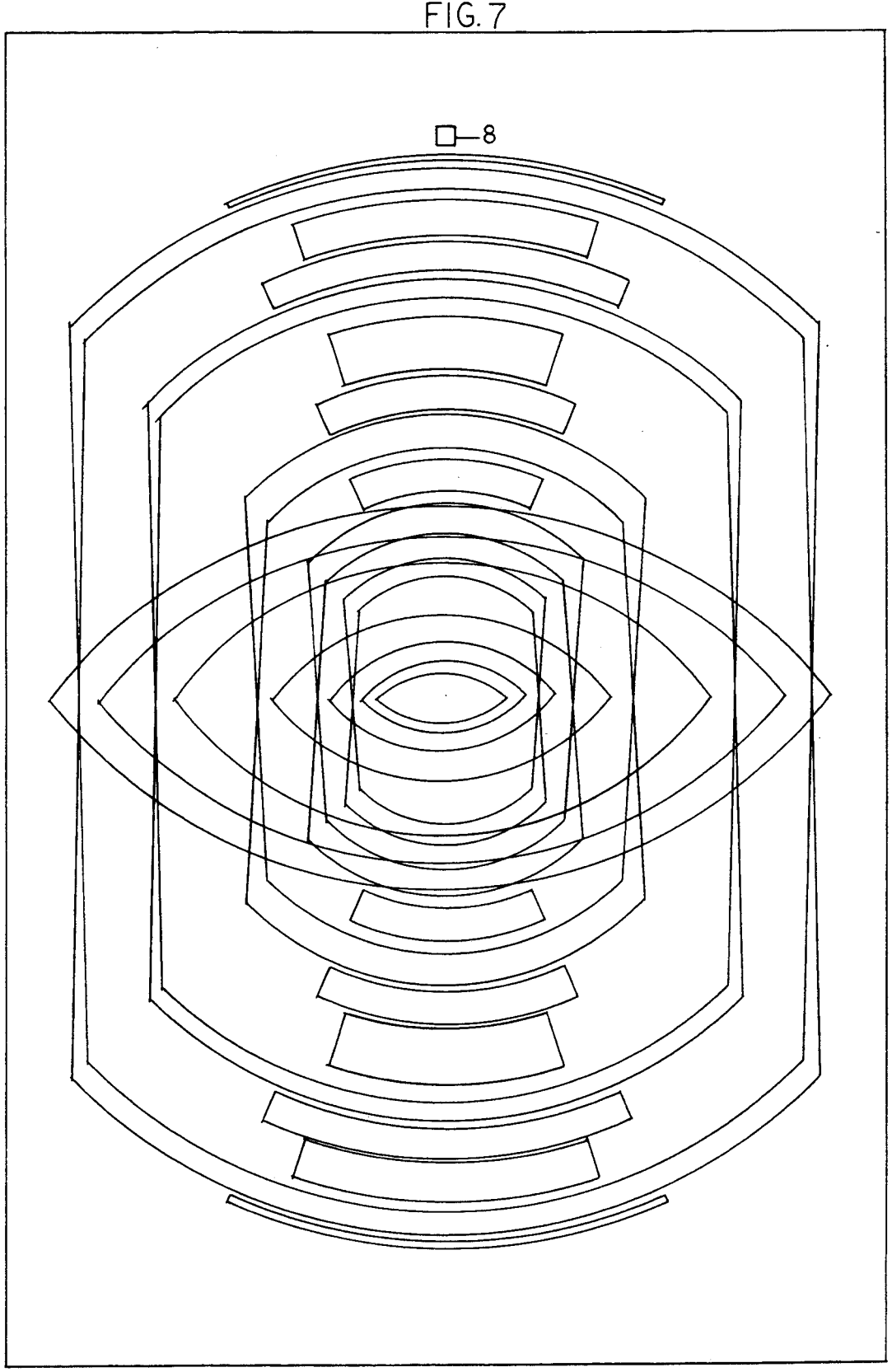
FIG. 7 shows the composite of FIGS. 3 through 6.

FIG. 7 features the complete diagram of the ESD (although without the electron spaces). Also shown in this Figure is the square cutout "window" 8 in the ESD, which shows each elemental symbol that is selected by turning the wheel to the desired postion. (The symbols are printed in places on the wheel that allow showing through the window.)

STATEMENT OF THE PREFERRED EMBODIMENT

In constructing the ESDM a hole the size of the axle-piece diameter is drilled at a point on the aluminum center of the axle-piece support frame 3, midway between the ends. Seven more holes (about 0.5 cm) are drilled along the length of that strip at points on either side of the center point, at the following distances from that center point. (These holes correspond to "electron-spaces" in the "s" subshells of the ESD.)

Distances left of center point:
1&⅞"; 2&5/16"; 4&6/8"; 7&16/32"; 9&8/16"; and 10&11/16" (Read, "one and seven-eighths inches; two and five-sixteenths inches;" etc.)

Distances right of center point:
1&6/8"; 2&3/16"; 3&⅛"; 4&⅝"; 7&13/32"; 9&7/16"; and 10&9/19" (Note: 1&⅞" is read "one and seven-eighths inches".)

Similarly, when the ESD board and the 31-inch diameter wheel are cut out, a hole in each the size of that made in the axle-piece support frame is drilled at the center.

Production of the ESD starts with penciling in on the plastic surface of the board a horizontal line, equally dividing the top and bottom halves, as well as a vertical line, equally dividing the left and right halves. From the centerpoint in the nascent diagram, lines at various angles are drawn to the outer edges of the board. In addition to a 45-degree angle-line, and its 135-degree left-side counterpart, (and the 90-/180-degree line already made) these angle-lines are:

66-degree; 72-degree; 78-degree; 84-degree (and left side counterparts)

96-degree; 102-degree; 108-degree; 114-degree The nascent diagram can then be turned upside down and the identical procedure followed in order to produce the symmetry seen in the ESD's top and bottom halves.

The next step is that of drawing concentric circles which, in the diagram, will mark the idealized paths of the "electrons" flashing in the electron-spaces in the completed diagram. The first two, and innermost, circles to be drawn have respectively a 1-and-6/8-inch radius and a 1-and-7/8-inch radius, as indicated in the chart below. (Later, one aperture will be made at the intersection of the first circle and the 0-degree angle-line and another at the intersection of the second circle and the 180-degree line, corresponding to the drilled holes on either side of axle-support-frame 3 in the drawings.)

Presented in the following chart are the radii of concentric circles whose intersection with the 0- /180-degree angle-line marks the location of electron-spaces in the "s" subshells. The upper and lower number-pairs indicate the right and left "end points" of "s" subshell elipses 12 in the drawings. The top row indicates points on the ESD's horizontal that are left of the centerpoint; the bottom row designates points to the right.

Refer to FIG. 4.

| 12K | 12L | 12M | 12N | 12O | 12P | | 12Q |
|---|---|---|---|---|---|---|---|
| 1&7/8"; | 2&5/16"; | 3&2/8"; | 4&6/8"; | 7&16/32"; | 9&8/16"; | and | 10&11/16" |
| 1&6/8"; | 2&3/16"; | 3&1/8"; | 4&5/8"; | 7&13/32"; | 9&7/16"; | and | 10&9/16" |

The radii of concentric circles forming the inner and outer arches of each (symmetrical upper and lower) half of each "p" subshell are as follows. (The upper and lower number-pairs below represent the outer and inner arches, respectively, of each "p" subshell half.)

Refer to FIG. 3.

| 11L | 11M | 11N | 11O | | 11P |
|---|---|---|---|---|---|
| 3&30/32"; | 5&13/32"; | 7&6/8"; | 11&1/2"; | and | 14&17/32" |
| 3&11/32"; | 4&20/32"; | 6&7/8"; | 11"; | | 13&28/32" |

The radii of concentric circles forming the inner and outer arches of each (symmetrical upper and lower) half of each "d" subshell are as follower. (The upper and lower number-pairs below represent the outer and inner arches, respectively, of each "d" subshell half.)

Refer to FIG. 5.

| 13M | 13N | 13O | | 13P |
|---|---|---|---|---|
| 6&9/16"; | 8&26/32"; | 12&14/32"; | and | 14&26/32" |
| 5&10/16"; | 7&27/32"; | 11&19/32"; | | 14&21/32" |

The radii of concentric circles forming the inner and outer arches of each (symmetrical upper and lower) half of each "f" subshell are as follows. (The upper and lower number-pairs below represent the outer and inner arches, respectively, of each "f" subshell half.)

Refer to FIG. 6.

| 14N | | 14O |
|---|---|---|
| 10&7/16" | and | 13&5/8" |
| 8&14/16" | | 12&4/8" |

The next step in the completion of the diagram is to identify the subshells (amid the myriad penciled circles and angle-lines) and color them in appropriately with markers. The 45- and 135-degree angle-lines (each continuing through the diagram's center point to the lower half) are the "shoulders" of the "p" (red) subshells. The 66- and 114-degree angle-lines (also continuing through the center point to the lower half) are the lateral enclosures of the "d" (blue) subshells. Finally, the 72- and 108-degree angle-lines (continuing to the lower diagram) are the lateral enclosures of the "f" (green) subshells. The "s" subshells are drawn, as mentioned earlier, as elipses whose right-left "end points" are drawn at the points of intersection between the 0- /180-degree angle-line and "s" subshell radii. as listed earlier. In other words, for each "s" subshell an elipse is drawn (on the diagram's horizontal) between the pair of radii indices presented earlier under the categories "12K","12L", etc.

Next in this sequence of steps is that of drawing the series of arcs that are situated within the arched subshells (i.e., within "p", "d", and "f"). The circles, of which these arcs are a part represent idealized electron paths. The number of arcs drawn within the inner and outer boundaries of an arched subshell is the same as the maximum number of electrons that may (lawfully) inhabit the subshell. So, for example, the "p" subshell having a maximum of 6 electrons will require six arcs between the inner and outer arches of that subshell- for both the upper and lower symmetrical halves of the subshell. The distance between arcs within a subshell is determined both by the maximum number of electrons that may inhabit the subshell and by the "height" of the subshell. (The "height" the subshell is the distance, on the 90-degree angle-line, between the inner and outer arches for either symmetrical half.) So, in order to determine the distance between arcs within the inner and outer arches of any subshell, divide the "height" of the subshell by the maximum number of electrons that may inhabit that subshell. Subshell "p", 11 in FIG. 3, serves again as an example. Between the outer and inner arches of a "p" subshell in the Figure will be drawn 6 (the maximum number of electrons for that subshell) arcs. The height of, for example, the "p" subshell of shell L 11L is the distance between the inner and outer arches of that subshell, as given in the chart of "the radii of concentric circles" above. As indicated by the chart, the distance between the outer and inner arches is:

$$3\&30/32'' - 3\&11/32'' = 19/32''$$

The "height," then, of 11L is 19/32ths of an inch, and this number divided by 6 electrons is approximately 3/32". Thus, from the inner (red) arch of 11L (i.e., 9B in FIG. 3) to the outer (red) arch (9A) of that subshell (for either or both symmetrical halves), there should be six arcs that are spaced about 3/32" apart.

So, in summary, the number of arcs in either half of a subshell is the same as the maximum allowable number of electrons for that subshell; the distance between arcs in a subshell is the "height" of the subshell (i.e., the difference in outer and inner radial boundaries of the subshell as given in the charts "of concentric circles") divided by the number of its arcs.

Before affixing the color-coded ESD at its center to the rest of the model, the tiny apertures (about 1 mm in diameter) representing electron-spaces are punched or drilled in the proper locations of the diagram. In order to present clearly the exact locations of those apertures, they will be listed, in the following Table, in the order in which electrons accumulate in shells and subshells and in the order in which shells and subshells radiate from the atomic center. The electron-spaces will be numbered (e1, e2, etc.), and the arcs in the subshells numbered (a-1, a-2, a-3, etc.) for convenience.

TABLE 1

Electron-Space Location Points in the ESD

Shell K
subshell "s"
(electrons located on 0- /180-degree angle-line)
e1: (1&7/8" left of center)          e2: (1&6/8" right of center Shell L
subshell "s"
e1: (2&5/16" left of center)          e2: (2&3/16" right of center subshell "p"
(Note that electron-spaces for "p" subshells start at the left "shoulder" of that subshell, and at the innermost arc, and continue in a clockwise direction with successive arcs)
e1: (a-1; 135-deg.)    e2: (a-2; 90-deg.)    e3: (a-3; 45-deg.)
e4: (a-4; 315-deg.)    e5: (a-5; 270-deg.)   e6: (a-6; 225-deg.)

Shell M
subshell "s"
e1: (3&2/8" left of center)          e2: (3&1/8" right of center)

subshell "p"
e1: (a-1; 135-deg.)    e2: (a-2; 90-deg.)    e3: (a-3; 45-deg.)
e4: (a-4; 315-deg.)    e5: (a-5; 270-deg.)   e6: (a-6; 225-deg.)

subshell "d"
e1: (a-1; 114-deg.)   e2: (a-2; 102-deg.)   e3: (a-3; 90-deg.)   e4: (a-4; 78-deg.)
                      e5: (a-5; 66-deg.)
e6: (a-6; 294-deg.)   e7: (a-7; 282-deg.)   e8: (a-8; 270-deg.)   e9: (a-9; 258-deg.)
                      e10: (a-10; 246-deg.)
(Note that the angle-lines from 294-deg. to 342-deg. are just the counterparts of the 114-deg. to 66-deg. angle-lines below the diagram's horizontal)

Shell N
subshell "s"
e1: (4&6/8" left of center)          e2: (4&5/8" right of center)

subshell "p"
e1: (a-1; 135-deg.)    e2: (a-2; 90-deg.)    e3: (a-3; 45-deg.)
e4: (a-4; 315-deg.)    e5: (a-5; 270-deg.)   e6: (a-6; 225-deg.)

subshell "d"
e1: (a-1; 114-deg.)   e2: (a-2; 102-deg.)   e3: (a-3; 90-deg.)   e4: (a-4; 78-deg.)
                      e5: (a-5; 66-deg.)

TABLE 1-continued

Electron-Space Location Points in the ESD e6: (a-6; 294-deg.)   e7: (a-7; 282-deg.)   e8: (a-8; 270-deg.)   e9: (a-9; 258-deg.)
e10: (a-10; 246-deg.)

subshell "f"

e1: (a-1; 108-deg.)   e2: (a-2; 102-deg.)   e3: (a-3; 96-deg.)   e4: (a-4; 90-deg.)
e5: (a-1; 84-deg.)   e6: (a-6; 78-deg.)   e7: (a-7; 72-deg.)
(and below the horizontal:)
e8: (a-8; 288-deg.)   e9: (a-9; 282-deg.)   e10: (a-10; 276-deg.)   e11: (a-11; 270-deg.)
e12: (a-12; 264-deg.)   e13: (a-13; 258-deg.)   e14: (a-14; 252-deg.)

Shell O
subshell "s"

e1: (7&16/32" left of center)   e2: (7&13/32" right of center)

subshell "p"

e1: (a-1; 135-deg.)   e2: (a-2; 90-deg.)   e3: (a-3; 45-deg.)
e4: (a-4; 315-deg.)   e5: (a-5; 270-deg.)   e6: (a-6; 225-deg.)

subshell "d"

e1: (a-1; 114-deg.)   e2: (a-2; 102-deg.)   e3: (a-3; 90-deg.)   e4: (a-4; 78-deg.)
e5: (a-5; 66-deg.)
(and below the horizontal:)
e6: (a-6; 294-deg.)   e7: (a-7; 282-deg.)   e8: (a-8; 270-deg.)   e9: (a-9; 258-deg.)
e10: (a-10; 246-deg.)

subshell "f"

e1: (a-1; 108-deg.)   e2: (a-2; 102-deg.)   e3: (a-3; 96-deg.)   e4: (a-4; 90-deg.)
e5: (a-1; 84-deg.)   e6: (a-6; 78-deg.)   e7: (a-7; 72-deg.)
(and below the horizontal:)
e8: (a-8; 288-deg.)   e9: (a-9; 282-deg.)   e10: (a-10; 276-deg.)   e11: (a-11; 270-deg.)
e12: (a-12; 264-deg.)   e13: (a-13; 258-deg.)   e14: (a-14; 252-deg.)

Shell P
subshell "s"

e1: (9&8/16" left of center)   e2: (9&7/16" right of center)

subshell "p"

e1: (a-1; 135-deg.)   e2: (a-2; 90-deg.)   e3: (a-3; 45-deg.)
e4: (a-4; 315-deg.)   e5: (a-5; 270-deg.)   e6: (a-6; 225-deg.)

subshell "d"

e1: (a-1; 114-deg.)   e2: (a-2; 102-deg.)   e3: (a-3; 90-deg.)   e4: (a-4; 78-deg.)
e5: (a-5; 66-deg.)
(and below the horizontal:)
e6: (a-6; 294-deg.)   e7: (a-7; 282-deg.)   e8: (a-8; 270-deg.)   e9: (a-9; 258-deg.)
e10: (a-10; 246-deg.)

Shell Q
subshell "s"

e1: (10&11/16" left of center)   e2: (10&9/16" right of center

---

The procedure for completing the ESDM requires knowledge of the electron distribution patterns, within subshells, for atoms of the 103 elements in a conventional *Periodic Table of The Elements*. Included in this procedural description is a chart taken from the textbook, *Introduction to Physics and Chemistry*, presenting these distribution patterns. In addition to the textbook Table, a reproduction thereof is presented here (as Table 2), for ease of viewing.

The Table, "Electron Configurations of the Elements", (pp.456–457) is taken from the textbook referenced as follows:

*Introduction to Physics and Chemistry* (Second Edition), McGraw-Hill:New York, 1974., Arthur Beiser and Konrad B. Krauskopf.

Referring regularly to either Table, the ESDM can be completed. Starting at either end of an ordered list of the elements from Hydrogen to Lawrencium, the first element is chosen to be displayed in the ESDM. (For ease of explanation, the procedure described here will begin with Hydrogen and move toward Lawrencium, even though in the model produced, the procedure began with Lawrencium and worked "backward" to Hydrogen.) The aforementioned Tables show that Hydrogen has one electron in the "s" subshell of shell K. A single electron ("e1") in the "s" subshell has arbitrarily been chosen to be placed on the right side of the (appropriate) elipse in the ESD. Thus, a tiny aperture (about a millimeter in diameter) is made in the wheel by drilling through the appropriate electron-space in the ESD. With the strobe lights that were fitted into the ESDM housing turned on, the tiny beam flashing through that single aperture in the ESD simulates a "stop action picture" of an electron inhabiting its appropriate shell (K) and subhell ("s") in the Hydrogen atom. All of the other electron-spaces in the

TABLE 2

| | | K | L | | M | | | N | | | | O | | | | P | | | Q |
|---|---|---|---|---|---|---|---|---|---|---|---|---|---|---|---|---|---|---|---|
| No. | E. | s | s | p | s | p | d | s | p | d | f | s | p | d | f | s | p | d | s |
| 1 | H | 1 | | | | | | | | | | | | | | | | | |
| 2 | He | 2 | | | | | | | | | | | | | | | | | |
| 3 | Li | 2 | 1 | | | | | | | | | | | | | | | | |
| 4 | Be | 2 | 2 | | | | | | | | | | | | | | | | |
| 5 | B | 2 | 2 | 1 | | | | | | | | | | | | | | | |
| 6 | C | 2 | 2 | 2 | | | | | | | | | | | | | | | |

TABLE 2-continued

Electron Configurations of the Elements

| No. | E. | K | L | | M | | | N | | | | O | | | | P | | | Q |
|---|---|---|---|---|---|---|---|---|---|---|---|---|---|---|---|---|---|---|---|
| | | s | s | p | s | p | d | s | p | d | f | s | p | d | f | s | p | d | s |
| 7 | N | 2 | 2 | 3 | | | | | | | | | | | | | | | |
| 8 | O | 2 | 2 | 4 | | | | | | | | | | | | | | | |
| 9 | F | 2 | 2 | 5 | | | | | | | | | | | | | | | |
| 10 | N | 2 | 2 | 6 | | | | | | | | | | | | | | | |
| 11 | Na | 2 | 2 | 6 | 1 | | | | | | | | | | | | | | |
| 12 | Mg | 2 | 2 | 6 | 2 | | | | | | | | | | | | | | |
| 13 | Al | 2 | 2 | 6 | 2 | 1 | | | | | | | | | | | | | |
| 14 | Si | 2 | 2 | 6 | 2 | 2 | | | | | | | | | | | | | |
| 15 | P | 2 | 2 | 6 | 2 | 3 | | | | | | | | | | | | | |
| 16 | S | 2 | 2 | 6 | 2 | 4 | | | | | | | | | | | | | |
| 17 | Cl | 2 | 2 | 6 | 2 | 5 | | | | | | | | | | | | | |
| 18 | A | 2 | 2 | 6 | 2 | 6 | | | | | | | | | | | | | |
| 19 | K | 2 | 2 | 6 | 2 | 6 | | 1 | | | | | | | | | | | |
| 20 | Ca | 2 | 2 | 6 | 2 | 6 | | 2 | | | | | | | | | | | |
| 21 | Sc | 2 | 2 | 6 | 2 | 6 | 1 | 2 | | | | | | | | | | | |
| 22 | Ti | 2 | 2 | 6 | 2 | 6 | 2 | 2 | | | | | | | | | | | |
| 23 | V | 2 | 2 | 6 | 2 | 6 | 3 | 2 | | | | | | | | | | | |
| 24 | Cr | 2 | 2 | 6 | 2 | 6 | 5 | 1 | | | | | | | | | | | |
| 25 | Mn | 2 | 2 | 6 | 2 | 6 | 5 | 2 | | | | | | | | | | | |
| 26 | Fe | 2 | 2 | 6 | 2 | 6 | 6 | 2 | | | | | | | | | | | |
| 27 | Co | 2 | 2 | 6 | 2 | 6 | 7 | 2 | | | | | | | | | | | |
| 28 | Ni | 2 | 2 | 6 | 2 | 6 | 8 | 2 | | | | | | | | | | | |
| 29 | Cu | 2 | 2 | 6 | 2 | 6 | 10 | 1 | | | | | | | | | | | |
| 30 | Zn | 2 | 2 | 6 | 2 | 6 | 10 | 2 | | | | | | | | | | | |
| 31 | Ga | 2 | 2 | 6 | 2 | 6 | 10 | 2 | 1 | | | | | | | | | | |
| 32 | Ge | 2 | 2 | 6 | 2 | 6 | 10 | 2 | 2 | | | | | | | | | | |
| 33 | As | 2 | 2 | 6 | 2 | 6 | 10 | 2 | 3 | | | | | | | | | | |
| 34 | Se | 2 | 2 | 6 | 2 | 6 | 10 | 2 | 4 | | | | | | | | | | |
| 35 | Br | 2 | 2 | 6 | 2 | 6 | 10 | 2 | 5 | | | | | | | | | | |
| 36 | Kr | 2 | 2 | 6 | 2 | 6 | 10 | 2 | 6 | | | | | | | | | | |
| 37 | Rb | 2 | 2 | 6 | 2 | 6 | 10 | 2 | 6 | | | 1 | | | | | | | |
| 38 | Sr | 2 | 2 | 6 | 2 | 6 | 10 | 2 | 6 | | | 2 | | | | | | | |
| 39 | Y | 2 | 2 | 6 | 2 | 6 | 10 | 2 | 6 | 1 | | 2 | | | | | | | |
| 40 | Zr | 2 | 2 | 6 | 2 | 6 | 10 | 2 | 6 | 2 | | 2 | | | | | | | |
| 41 | Nb | 2 | 2 | 6 | 2 | 6 | 10 | 2 | 6 | 4 | | 1 | | | | | | | |
| 42 | Mo | 2 | 2 | 6 | 2 | 6 | 10 | 2 | 6 | 5 | | 1 | | | | | | | |
| 43 | Tc | 2 | 2 | 6 | 2 | 6 | 10 | 2 | 6 | 5 | | 2 | | | | | | | |
| 44 | Ru | 2 | 2 | 6 | 2 | 6 | 10 | 2 | 6 | 7 | | 1 | | | | | | | |
| 45 | Rh | 2 | 2 | 6 | 2 | 6 | 10 | 2 | 6 | 8 | | 1 | | | | | | | |
| 46 | Pd | 2 | 2 | 6 | 2 | 6 | 10 | 2 | 6 | 10 | | | | | | | | | |
| 47 | Ag | 2 | 2 | 6 | 2 | 6 | 10 | 2 | 6 | 10 | | 1 | | | | | | | |
| 48 | Cd | 2 | 2 | 6 | 2 | 6 | 10 | 2 | 6 | 10 | | 2 | | | | | | | |
| 49 | In | 2 | 2 | 6 | 2 | 6 | 10 | 2 | 6 | 10 | | 2 | 1 | | | | | | |
| 50 | Sn | 2 | 2 | 6 | 2 | 6 | 10 | 2 | 6 | 10 | | 2 | 2 | | | | | | |
| 51 | Sb | 2 | 2 | 6 | 2 | 6 | 10 | 2 | 6 | 10 | | 2 | 3 | | | | | | |
| 52 | Te | 2 | 2 | 6 | 2 | 6 | 10 | 2 | 6 | 10 | | 2 | 4 | | | | | | |
| 53 | I | 2 | 2 | 6 | 2 | 6 | 10 | 2 | 6 | 10 | | 2 | 5 | | | | | | |
| 54 | Xe | 2 | 2 | 6 | 2 | 6 | 10 | 2 | 6 | 10 | | 2 | 6 | | | | | | |
| 55 | Cs | 2 | 2 | 6 | 2 | 6 | 10 | 2 | 6 | 10 | | 2 | 6 | | | 1 | | | |
| 56 | Ba | 2 | 2 | 6 | 2 | 6 | 10 | 2 | 6 | 10 | | 2 | 6 | | | 2 | | | |
| 57 | La | 2 | 2 | 6 | 2 | 6 | 10 | 2 | 6 | 10 | | 2 | 6 | 1 | | 2 | | | |
| 58 | Ce | 2 | 2 | 6 | 2 | 6 | 10 | 2 | 6 | 10 | 2 | 2 | 6 | | | 2 | | | |
| 59 | Pr | 2 | 2 | 6 | 2 | 6 | 10 | 2 | 6 | 10 | 3 | 2 | 6 | | | 2 | | | |
| 60 | Nd | 2 | 2 | 6 | 2 | 6 | 10 | 2 | 6 | 10 | 4 | 2 | 6 | | | 2 | | | |
| 61 | Pm | 2 | 2 | 6 | 2 | 6 | 10 | 2 | 6 | 10 | 5 | 2 | 6 | | | 2 | | | |
| 62 | Sm | 2 | 2 | 6 | 2 | 6 | 10 | 2 | 6 | 10 | 6 | 2 | 6 | | | 2 | | | |
| 63 | Eu | 2 | 2 | 6 | 2 | 6 | 10 | 2 | 6 | 10 | 7 | 2 | 6 | | | 2 | | | |
| 64 | Gd | 2 | 2 | 6 | 2 | 6 | 10 | 2 | 6 | 10 | 7 | 2 | 6 | 1 | | 2 | | | |
| 65 | Tb | 2 | 2 | 6 | 2 | 6 | 10 | 2 | 6 | 10 | 8 | 2 | 6 | 1 | | 2 | | | |
| 66 | Dy | 2 | 2 | 6 | 2 | 6 | 10 | 2 | 6 | 10 | 10 | 2 | 6 | | | 2 | | | |
| 67 | Ho | 2 | 2 | 6 | 2 | 6 | 10 | 2 | 6 | 10 | 11 | 2 | 6 | | | 2 | | | |
| 68 | Er | 2 | 2 | 6 | 2 | 6 | 10 | 2 | 6 | 10 | 12 | 2 | 6 | | | 2 | | | |
| 69 | Tm | 2 | 2 | 6 | 2 | 6 | 10 | 2 | 6 | 10 | 13 | 2 | 6 | | | 2 | | | |
| 70 | Yb | 2 | 2 | 6 | 2 | 6 | 10 | 2 | 6 | 10 | 14 | 2 | 6 | | | 2 | | | |
| 71 | Lu | 2 | 2 | 6 | 2 | 6 | 10 | 2 | 6 | 10 | 14 | 2 | 6 | 1 | | 2 | | | |
| 72 | Hf | 2 | 2 | 6 | 2 | 6 | 10 | 2 | 6 | 10 | 14 | 2 | 6 | 2 | | 2 | | | |
| 73 | Ta | 2 | 2 | 6 | 2 | 6 | 10 | 2 | 6 | 10 | 14 | 2 | 6 | 3 | | 2 | | | |
| 74 | W | 2 | 2 | 6 | 2 | 6 | 10 | 2 | 6 | 10 | 14 | 2 | 6 | 4 | | 2 | | | |
| 75 | Re | 2 | 2 | 6 | 2 | 6 | 10 | 2 | 6 | 10 | 14 | 2 | 6 | 5 | | 2 | | | |
| 76 | Os | 2 | 2 | 6 | 2 | 6 | 10 | 2 | 6 | 10 | 14 | 2 | 6 | 6 | | 2 | | | |
| 77 | Ir | 2 | 2 | 6 | 2 | 6 | 10 | 2 | 6 | 10 | 14 | 2 | 6 | 7 | | 2 | | | |
| 78 | Pt | 2 | 2 | 6 | 2 | 6 | 10 | 2 | 6 | 10 | 14 | 2 | 6 | 9 | | 1 | | | |
| 79 | Au | 2 | 2 | 6 | 2 | 6 | 10 | 2 | 6 | 10 | 14 | 2 | 6 | 10 | | 1 | | | |
| 80 | Hg | 2 | 2 | 6 | 2 | 6 | 10 | 2 | 6 | 10 | 14 | 2 | 6 | 10 | | 2 | | | |
| 81 | Tl | 2 | 2 | 6 | 2 | 6 | 10 | 2 | 6 | 10 | 14 | 2 | 6 | 10 | | 2 | 1 | | |
| 82 | Pb | 2 | 2 | 6 | 2 | 6 | 10 | 2 | 6 | 10 | 14 | 2 | 6 | 10 | | 2 | 2 | | |
| 83 | Bi | 2 | 2 | 6 | 2 | 6 | 10 | 2 | 6 | 10 | 14 | 2 | 6 | 10 | | 2 | 3 | | |
| 84 | Po | 2 | 2 | 6 | 2 | 6 | 10 | 2 | 6 | 10 | 14 | 2 | 6 | 10 | | 2 | 4 | | |

TABLE 2-continued

| | | Electron Configurations of the Elements | | | | | | | | | | | | | | | | |
|---|---|---|---|---|---|---|---|---|---|---|---|---|---|---|---|---|---|---|
| | | K | L | | M | | | N | | | | O | | | | P | | Q |
| No. | E. | s | s | p | s | p | d | s | p | d | f | s | p | d | f | s | p | d | s |
| 85 | At | 2 | 2 | 6 | 2 | 6 | 10 | 2 | 6 | 10 | 14 | 2 | 6 | 10 | | 2 | 5 | | |
| 86 | Rn | 2 | 2 | 6 | 2 | 6 | 10 | 2 | 6 | 10 | 14 | 2 | 6 | 10 | | 2 | 6 | | |
| 87 | Fr | 2 | 2 | 6 | 2 | 6 | 10 | 2 | 6 | 10 | 14 | 2 | 6 | 10 | | 2 | 6 | | 1 |
| 88 | Ra | 2 | 2 | 6 | 2 | 6 | 10 | 2 | 6 | 10 | 14 | 2 | 6 | 10 | | 2 | 6 | | 2 |
| 89 | Ac | 2 | 2 | 6 | 2 | 6 | 10 | 2 | 6 | 10 | 14 | 2 | 6 | 10 | | 2 | 6 | 1 | 2 |
| 90 | Th | 2 | 2 | 6 | 2 | 6 | 10 | 2 | 6 | 10 | 14 | 2 | 6 | 10 | | 2 | 6 | 2 | 2 |
| 91 | Pa | 2 | 2 | 6 | 2 | 6 | 10 | 2 | 6 | 10 | 14 | 2 | 6 | 10 | 2 | 2 | 6 | 1 | 2 |
| 92 | U | 2 | 2 | 6 | 2 | 6 | 10 | 2 | 6 | 10 | 14 | 2 | 6 | 10 | 3 | 2 | 6 | 1 | 2 |
| 93 | Np | 2 | 2 | 6 | 2 | 6 | 10 | 2 | 6 | 10 | 14 | 2 | 6 | 10 | 4 | 2 | 6 | 1 | 2 |
| 94 | Pu | 2 | 2 | 6 | 2 | 6 | 10 | 2 | 6 | 10 | 14 | 2 | 6 | 10 | 5 | 2 | 6 | 1 | 2 |
| 95 | Am | 2 | 2 | 6 | 2 | 6 | 10 | 2 | 6 | 10 | 14 | 2 | 6 | 10 | 6 | 2 | 6 | 1 | 2 |
| 96 | Cm | 2 | 2 | 6 | 2 | 6 | 10 | 2 | 6 | 10 | 14 | 2 | 6 | 10 | 7 | 2 | 6 | 1 | 2 |
| 97 | Bk | 2 | 2 | 6 | 2 | 6 | 10 | 2 | 6 | 10 | 14 | 2 | 6 | 10 | 8 | 2 | 6 | 1 | 2 |
| 98 | Cf | 2 | 2 | 6 | 2 | 6 | 10 | 2 | 6 | 10 | 14 | 2 | 6 | 10 | 10 | 2 | 6 | | 2 |
| 99 | Es | 2 | 2 | 6 | 2 | 6 | 10 | 2 | 6 | 10 | 14 | 2 | 6 | 10 | 11 | 2 | 6 | | 2 |
| 100 | Fm | 2 | 2 | 6 | 2 | 6 | 10 | 2 | 6 | 10 | 14 | 2 | 6 | 10 | 12 | 2 | 6 | | 2 |
| 101 | Md | 2 | 2 | 6 | 2 | 6 | 10 | 2 | 6 | 10 | 14 | 2 | 6 | 10 | 13 | 2 | 6 | — | 2 |
| 102 | No | 2 | 2 | 6 | 2 | 6 | 10 | 2 | 6 | 10 | 14 | 2 | 6 | 10 | 14 | 2 | 6 | | 2 |
| 103 | Lr | 2 | 2 | 6 | 2 | 6 | 10 | 2 | 6 | 10 | 14 | 2 | 6 | 10 | 14 | 2 | 6 | | 2 | diagram are, for this element, without light to indicate that no other electrons are present in the (normal) Hydrogen atom. The wheel is then turned three degrees (3-degree sections are marked off on the wheel beforehand) and the procedure repeated for the next element in series: Helium (or Nobelium). When the wheel is precisely in place as before, apertures are made in the wheel (through the appropriate apertures made earlier in the ESD) corresponding to the electron distribution for Helium (or Nobelium) presented in the Tables—i.e., a full K shell. Each time that an appropriate alignment of apertures have been made in the ESD and wheel to correspond with the electron distribution for a particular element, the symbol for that element is printed on the wheel such that the symbol shows in the ESD's window.

This procedure is continued for each successive element up to and including Lawrencium—or if working backward, continued for each successive element "down" to and including Hydrogen. In a room with dimmed light, and with all of the strobe light sets plugged in and turned on, the Electron-Space Diagram shows the pattern of electron distribution, as it is presented in the electron distribution Tables, for each element whose symbol shows in the window.

As mentioned earlier, "s" subshells are "filled" from right to left, meaning that a single electron in an "s" subshell is always made to show on the right side of the diagram. However, as is indicated in Table 1, the other subshells start "filling" their electron-spaces at the top, left-most spaces, and continue in a clock-wise fashion. So, for example, in the case of the Fluorine, which has 9 electrons, the "s" subshell of shell K is full, as is the "s" subshell of shell L; but the "p" subshell of shell L has only five of its six possible electron-spaces filled. In this case making apertures in the wheel, corresponding to the "p" subshell of Fluorine on the ESD, would begin (see Table 1) with "e1" at the position: "a-1; 135-degrees," and end with "e5" at the position: "a-5; 270-degrees".

It may be noted that in Table 2, the subshells are listed with a number before them (e.g., "1s," "2s, . . . 2p," etc.). These numbers are merely a numerical indication of the the shell to which those subshells belong. There are seven shells, from K to Q, and seven different ordinals listed with the subshell symbols. "1" indicates the first shell, K; "2," the second shell, L; "3," the third shell, M, etc. So, for example, "5d" is another way of expressing the "d" subshell of the fifth shell, O.

The Electron-Space Diagram and Display Model can be made to accomodate the confirmed discovery of elements in succession to Lawrencium, since the "d" subshell of shell P can be "heightened" to include more arcs and thus more electron-spaces (i.e., in addition to the ones presently at 114- and 102- degrees). Indeed the entire ESD could, if it became necessary, be broadened to include successive shells and subshells (successive, that is, to those already present), keeping the same design pattern and design connection among the subshells as presently exhibited.

I claim:

1. A device for displaying lights in various patterns comprising:
    a) housing structure;
    b) a display board affixed to said housing structure, said display board bearing a diagram and having systematically positioned apertures;
    c) an axle aligned with an absolute center of said board;
    d) a disk-shaped wheel rotatably affixed to said axle arid having systematically positioned apertures, said wheel being in juxtaposition with said display board such that said wheel may be rotated relative to said display board and a number of said apertures of each of said display board and said wheel may be brought into and out of alignment relative to each other; and
    e) at least one strobe light for producing flashing light, said at least one strobe light being supported by said housing structure, said housing structure aiding in focusing the flashing light of said at least one strobe light toward the apertures of said display board and said wheel.

2. An educational device which aids in the conceptualization of how electrons lawfully inhabit space confinements, called shells and subshells, around an atomic nucleus comprising:
    a) a display board having a center, a front face, and a back face, said front face having a diagram, said diagram depicting atomic shells and subshells, said diagram further depicting places where, conceptually, electrons would lawfully inhabit said shells and subshells; and b) a disk-shaped wheel having a center and a first face, said first face of said wheel being in juxtaposition with and rotatably attached to said back face of said display board.

3. The educational device of claim 2 and further comprising:

c) apertures systematically positioned in each of said display board and said wheel such that a number of said apertures positioned in said wheel may be brought into and out of alignment relative to a number of said apertures in said display board to selectively create a number of various patterns, a respective one of said patterns corresponding to the electron distribution for a particular element when light emits from aligned apertures forming said respective pattern.

4. The educational device of claim 3, wherein said number of various patterns equals 103 corresponding to the 103 different electron distributions for the 103 known conventional elements.

5. The educational device of claim 3, wherein said wheel may be rotated to any one of a plurality of preset positions, wherein each of said preset positions effects an alignment between said wheel apertures and said board apertures which corresponds to the electron distribution pattern of one of a plurality of elements from a periodic table.

6. The educational device of claim 5, wherein said plurality of preset positions equals at least the number of elements in a conventional periodic table.

7. The educational device of claim 5, wherein said plurality of elements equals at least the number of elements in a conventional periodic table.

* * * * *